US012722721B1

(12) United States Patent
Wu

(10) Patent No.: US 12,722,721 B1
(45) Date of Patent: Sep. 1, 2026

(54) ANTI-THEFT GOOSENECK BALL AND ANTI-THEFT METHOD

(71) Applicant: Ruochen Wu, Xiaogan (CN)

(72) Inventor: Ruochen Wu, Xiaogan (CN)

( * ) Notice: Subject to any disclaimer, the term of this patent is extended or adjusted under 35 U.S.C. 154(b) by 0 days.

(21) Appl. No.: 19/273,415

(22) Filed: Jul. 18, 2025

(51) Int. Cl.
*B62D 53/08* (2006.01)

(52) U.S. Cl.
CPC .................................... *B62D 53/08* (2013.01)

(58) Field of Classification Search
CPC ...................................................... B62D 53/08
USPC ........................................................... 70/258
See application file for complete search history.

(56) References Cited

U.S. PATENT DOCUMENTS 5,343,720 A * 9/1994 Slater ....................... B60D 1/60 280/507
7,121,121 B2 * 10/2006 Wyers ...................... B60D 1/60 70/38 A
7,353,671 B2 * 4/2008 Recknagel .............. E05B 77/34 70/462
8,151,605 B1 * 4/2012 Gustafson ................ B60D 1/60 70/32
2002/0140207 A1 * 10/2002 McCoy .................... B60D 1/07 280/511
2015/0258865 A1 * 9/2015 Marcy .................... B62D 53/08 280/415.1
2023/0030021 A1 * 2/2023 Huff ......................... B60D 1/62
2024/0198744 A1 * 6/2024 Borkholder ............ B60D 1/075

* cited by examiner

*Primary Examiner* — Nathan Cumar
(74) *Attorney, Agent, or Firm* — Birchwood IP

(57) ABSTRACT

An anti-theft gooseneck ball and an anti-theft method are provided, the anti-theft gooseneck ball includes a housing, one end of the housing passes through a ball hook mounting seat; a locking component provided on the housing, the locking component includes a plurality of clamping pieces, the housing is provided with a plurality of clamping holes, and each of the clamping pieces respectively passes through and is slidably fit in each of the clamping holes; when the locking component is locked, all clamping pieces are fixed with the ball hook mounting seat, and the locking component is fixedly connected to the housing. This application has the effect of reducing the risk of goose neck ball being stolen.

10 Claims, 16 Drawing Sheets

ANTI-THEFT GOOSENECK BALL AND ANTI-THEFT METHOD

TECHNICAL FIELD

The present disclosure relates to the field of gooseneck ball technologies, and in particular, to an anti-theft gooseneck ball and an anti-theft method.

BACKGROUND

At present, more and more users in the domestic market are starting to use and engage in outdoor sports, including RVs, trailers, yachts and other products. These large products require a trailer connection with the car during use, so that RVs, trailers, yachts and other vehicles can travel. Generally speaking, by setting a goose neck ball at a rear of the car and a trailer ball cover at a front of the RV, trailer, yacht, etc., the trailer ball cover can press and fix the trailer ball part of the goose neck ball inside the trailer ball cover to complete the trailer connection between the RV, trailer, yacht and the car.

At present, when cars on the market are leaving the factory, there is no gooseneck ball at the rear of the car, and users need to configure it by themselves. Generally, by installing a ball hook mounting seat at the rear of the car and then installing the gooseneck ball on the ball hook mounting seat, it is easy to replace different styles of gooseneck balls according to actual needs. At present, there is a threaded connection between the gooseneck ball and the ball hook mounting seat on the market, that is, an external thread is set on the gooseneck ball, an internal thread is set on the ball hook mounting seat, and the gooseneck ball is screwed onto the ball hook mounting seat.

Regarding relevant technologies mentioned above, simply twisting the gooseneck ball onto the ball hook mounting seat poses a risk of theft.

SUMMARY

In order to reduce the risk of goose neck ball theft, this application provides an anti-theft goose neck ball.

The anti-theft gooseneck ball and an anti-theft method provided in this application adopt the following technical solution.

An anti-theft goose neck ball, including a housing, one end of the housing passes through a ball hook mounting seat;

- a locking component, where the locking component is provided on the housing, the locking component includes a plurality of clamping pieces and a lock core, the housing is provided with a plurality of clamping holes, and each of the clamping pieces respectively passed through and is slidably fitted into each of the clamping holes, and the lock core is slidably fitted into the housing;
- when the lock core is slid towards the housing and is locked, each of the clamping pieces is fixed and engaged with the ball hook mounting seat.

By adopting the above technical solution, when the gooseneck ball is provided on the ball hook mounting seat, one end of the housing passes through the ball hook mounting seat, and each of the clamping pieces is slid along each of the clamping hole in a direction away from the center of the housing until all clamping pieces are clamped and fixed to the ball hook mounting seat. Then, the locking component is locked, so that the locking component is fixed to the housing, and each of the clamping pieces always remains clamped and fixed to the ball hook mounting seat. At the same time, the locking component is locked and fixed to the housing, so that when the locking component is not unlocked, the gooseneck ball is not easily removed from the ball hook mounting seat, thereby reducing the risk of theft of the gooseneck ball and improving the problem of the gooseneck ball being easily screwed onto the ball hook mounting seat, which poses a risk of theft.

In some embodiments of the present disclosure, the locking component further includes a locking rod, the locking rod passes through and is slidably fitted into the housing, and the locking rod is fixedly connected to the lock core; the locking rod includes a clamping section, a conical section, and a cylindrical section; the clamping section, the conical section, and the cylindrical section are sequentially connected; when the cylindrical section abuts against each of the clamping pieces, the locking component is unlocked, and the locking rod is slid, so that when the locking rod abuts against each of the clamping pieces and is slid from the cylindrical section to the clamping section, the locking rod pushes each of the clamping pieces to clamp and fix with the ball hook mounting seat.

In some embodiments of the present disclosure, the locking component further includes a lock core, which is slidably fitted with the housing, and is fixedly connected to the locking rod;

- a locking block, the locking block is slidably fitted with the lock core; the housing is provided with a locking groove; when the locking component is locked to fix with the housing, the lock core is slid in a direction close to the housing until it contacts and fits with the housing; the lock core is driven to push the locking block to pass through and be clamped into the locking groove.

In some embodiments of the present disclosure, the lock core is rotatably connected with a lock cover, and the lock cover is configured to cover a lock hole of the lock core.

In some embodiments of the present disclosure, the locking component further includes a reset spring, and the reset spring is provided between the locking rod and the housing; one end of the reset spring abuts against the locking rod, and the other end of the reset spring abuts against the housing.

In some embodiments of the present disclosure, one end of the housing is connected to a bottom sheet, and the bottom sheet is disassembled from the housing; when the bottom sheet is disassembled and detached from the housing, the reset spring is disassembled detached from the housing.

In some embodiments of the present disclosure, the clamping pieces have a shape of a sphere.

In some embodiments of the present disclosure, a diameter of the clamping hole is gradually decreased from a center of the housing to an outer side of the housing.

In some embodiments of the present disclosure, there are three clamping pieces, and the clamping pieces are distributed around an axis of the housing in a circumferential direction.

An anti-theft method for the goose neck ball, including the following steps:

- (a) passing through one end of the goose neck ball into the ball hook mounting seat;
- (b) pushing the lock core until it abuts against the housing, so that all clamping pieces are fixed to the ball hook mounting seat;
- (c) driving the lock core to drive the driving block to be inserted and fixed in the locking slot, that is, the lock core is locked, so that the locking component is fixed to the housing;

(d) opening the lock core, by a key; causing the lock core to leave the lock slot; causing the driving block to move upwards, and all clamping pieces are unlocked with the ball hook mounting seat.

In summary, this application includes at least one beneficial technical effect as follows.

When the gooseneck ball is provided on the ball hook mounting seat, one end of the housing passes through the ball hook mounting seat, and each of the clamping pieces is slid along each of the clamping holes in a direction away from the center of the housing until all clamping pieces are clamped and fixed to the ball hook mounting seat. Then, the locking component is locked, so that the locking component is fixed to the housing, and each of the clamping pieces is always clamped and fixed to the ball hook mounting seat. At the same time, the locking component is locked and fixed to the housing, so that when the locking component is not unlocked, the gooseneck ball is not easily removed from the ball hook mounting seat, thereby reducing the risk of theft of the gooseneck ball and improving the problem of easy twisting of the gooseneck ball on the ball hook mounting seat, which poses a risk of theft.

Numeral reference: 1—housing; 10—ball hook mounting seat; 11—spherical part; 12—trailer part; 13—main body part; 14—installation part; 15—bottom sheet; 100—locking hole; 101—first hole segment; 102—second hole segment; 103—third hole segment; 200—clamping hole; 300—fixing groove; 301—locking groove; 2—locking component; 21—clamping piece; 22—locking rod; 221—rod body section; 222—clamping section; 223—conical section; 224—cylindrical section; 225—bottom section; 23—reset spring; 24—lock core; 241—lock cover; 25—locking block.

DESCRIPTION OF EMBODIMENTS

Further detailed explanation of the present application will be provided in combination with FIGS. 1-16.

This application discloses an anti-theft gooseneck ball and an anti-theft method. Referring to FIGS. 1, 2, 11 and 16, the anti-theft gooseneck ball includes a housing 1 and a locking component 2. The locking component 2 is provided on the housing 1 and configured to fix the housing 1 and the ball hook mounting seat 10.

Figure 1:
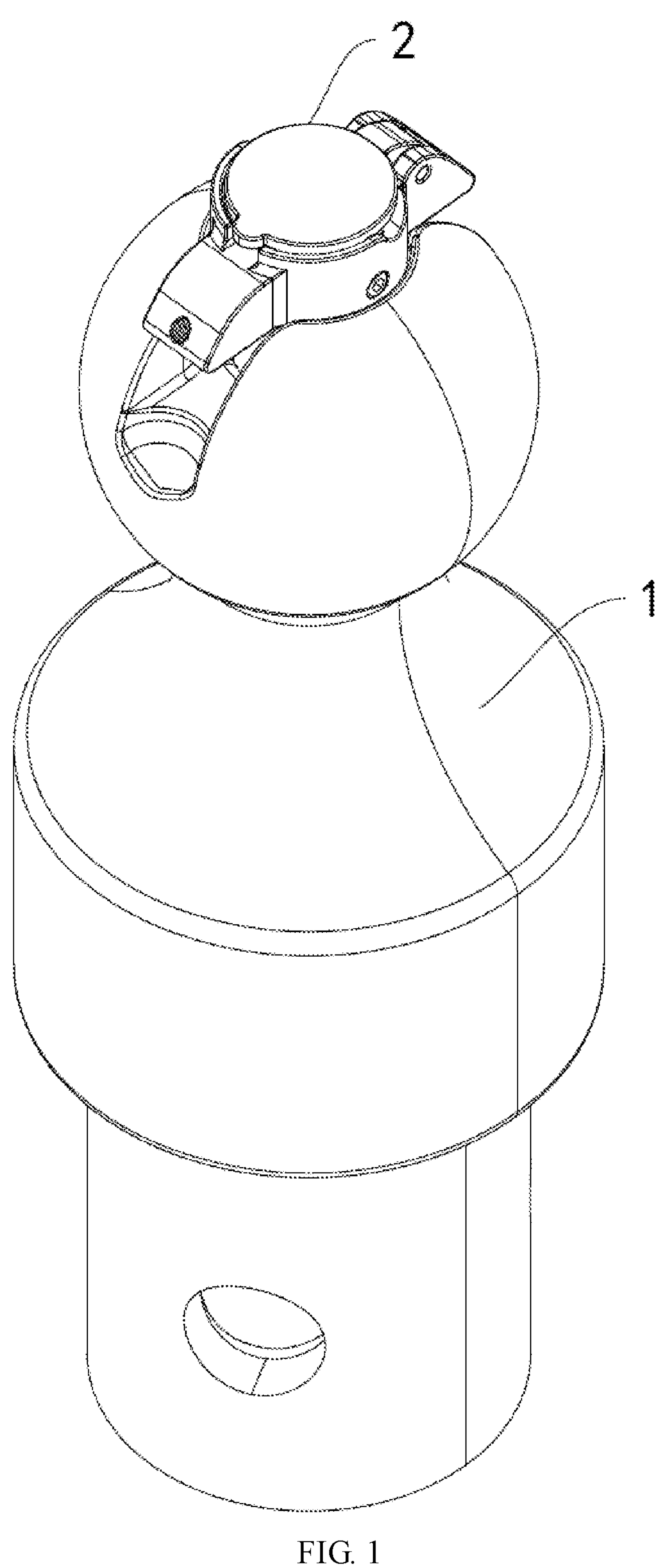
FIG. 1 is a schematic diagram of an overall structure of an embodiment of the present application.
Figure 2:
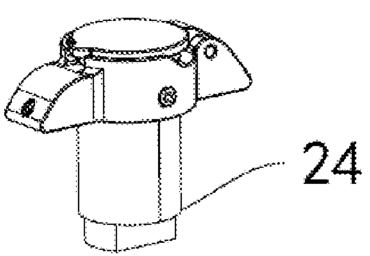
FIG. 2 is an exploded view of a locking component in an embodiment of the present application.
Figure 2:
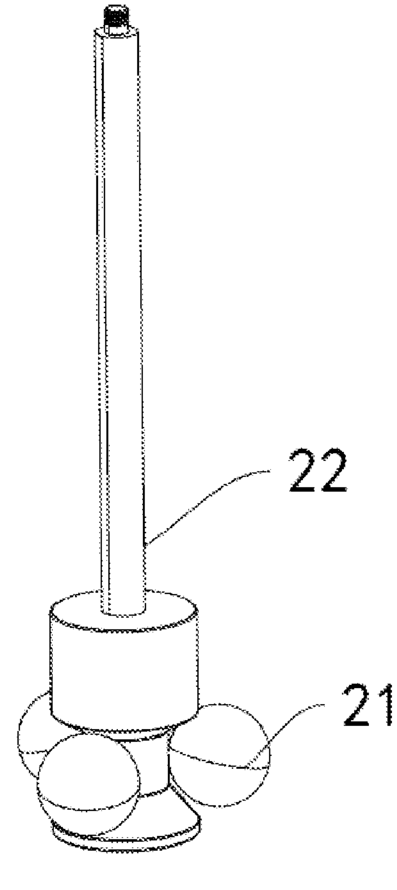
Figure 2:
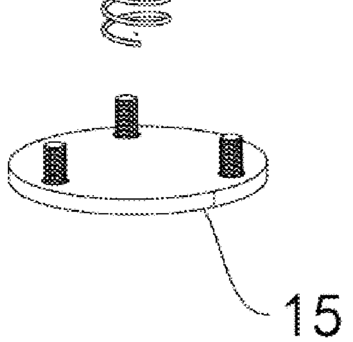
Figure 3:
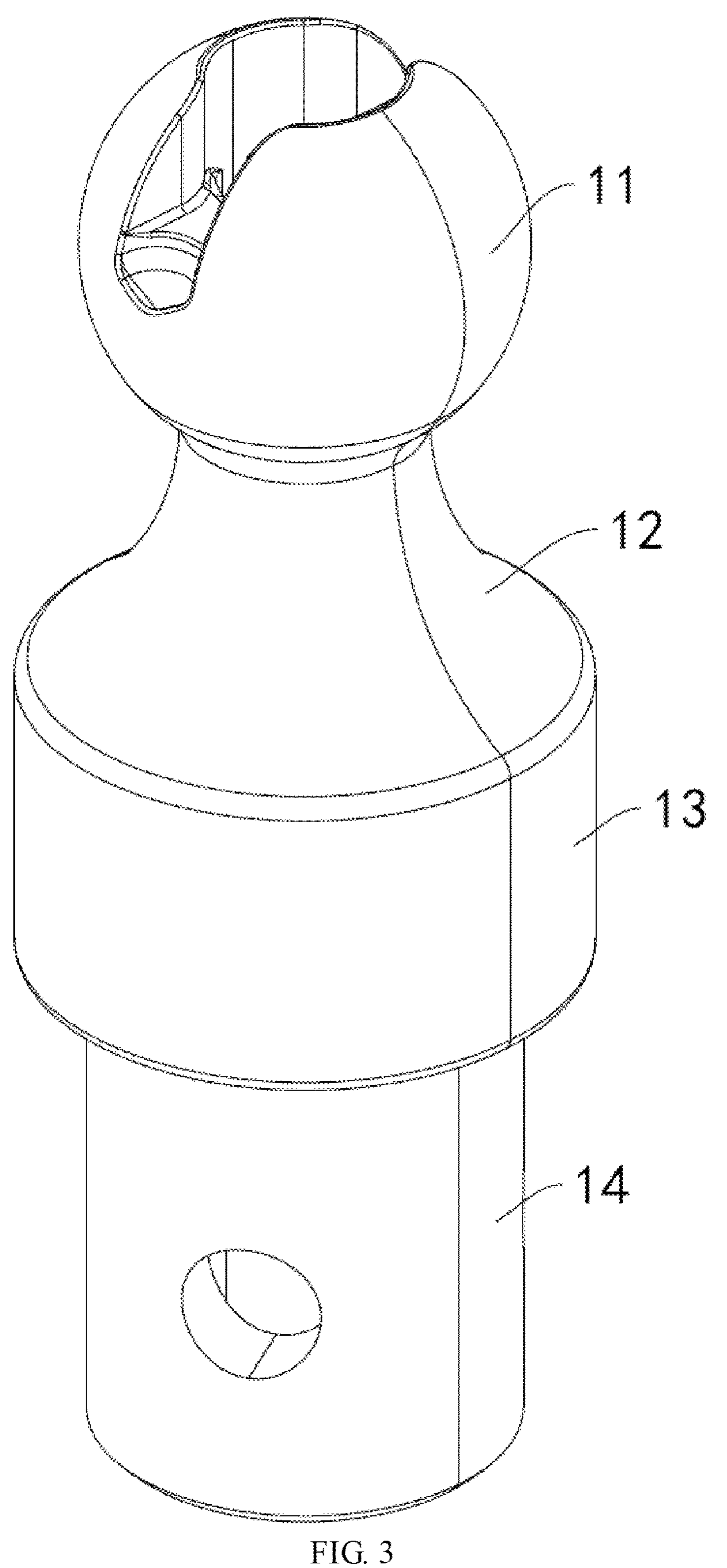
FIG. 3 is a schematic structural diagram of a housing of an embodiment of the present application.

Referring to FIG. 3, the housing 1 includes a spherical part 11, a trailer part 12, a main body part 13, and an installation part 14. The spherical part 11, the trailer part 12, the main body part 13, and the installation part 14 are fixedly connected to each other in sequence. A cross section of the trailer part 12 is circular, and a diameter of the trailer part 12 is gradually increased from the main body part 13 to the spherical part 11. A diameter of a cross section of the spherical part 11 is gradually increased in a direction away from the trailer part 12 until it reaches the diameter of the spherical part 11, in order to achieve a smooth transition between the main body part 13 and the spherical part 11, and at the same time render a trailer rope more stably connected to the trailer part 12. The main body part 13 and the installation part 14 are both cylindrical, and a diameter of the main body part 13 is larger than that of the installation part 14. When the housing passes through the ball hook mounting seat 10, the installation part 14 passes through the ball hook installation seat, and the main body part 13 abuts against the ball hook installation seat.

Figure 4:
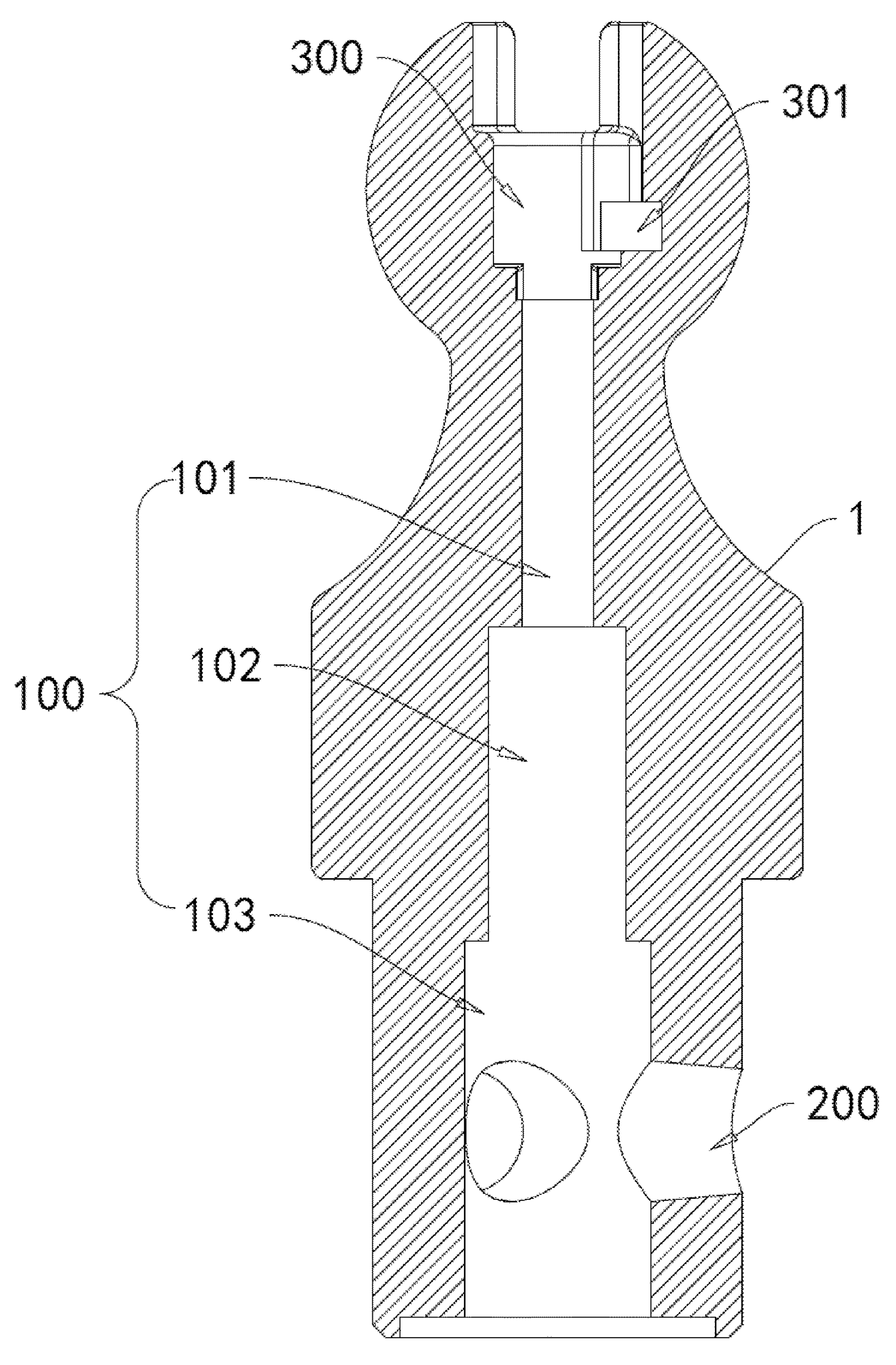
FIG. 4 is a sectional view of the housing of an embodiment of the present application.
Figure 5:
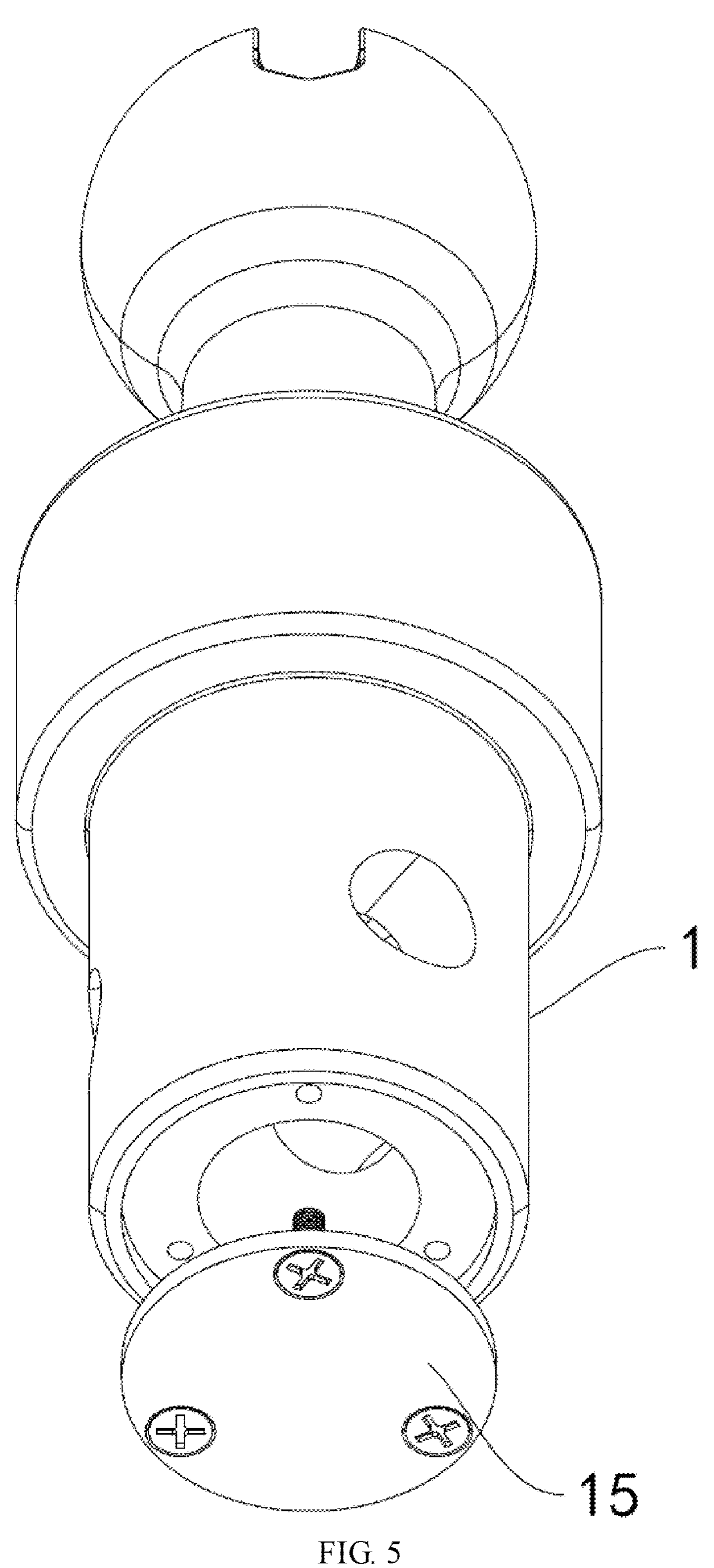
FIG. 5 is a schematic structural diagram of a bottom sheet in an embodiment of the present application.

Referring to FIGS. 4 and 5, one end of the housing 1 is provided with a locking hole 100, and the locking hole 100 includes a first hole segment 101, a second hole segment 102, and a third hole segment 103. The first hole segment 101, the second hole segment 102, and the third hole segment 103 are sequentially connected, and diameters of the first hole segment 101, the second hole segment 102, and the third hole segment 103 are gradually increased. One end of the housing 1 is connected to a bottom sheet 15, and the bottom sheet 15 is fixedly connected to the housing 1 by a plurality of screws, so that the bottom sheet 15 can be disassembled and detached from the housing 1. When the bottom sheet 15 is connected to the housing 1, the locking hole 100 is closed by the bottom sheet 15.

Figure 6:
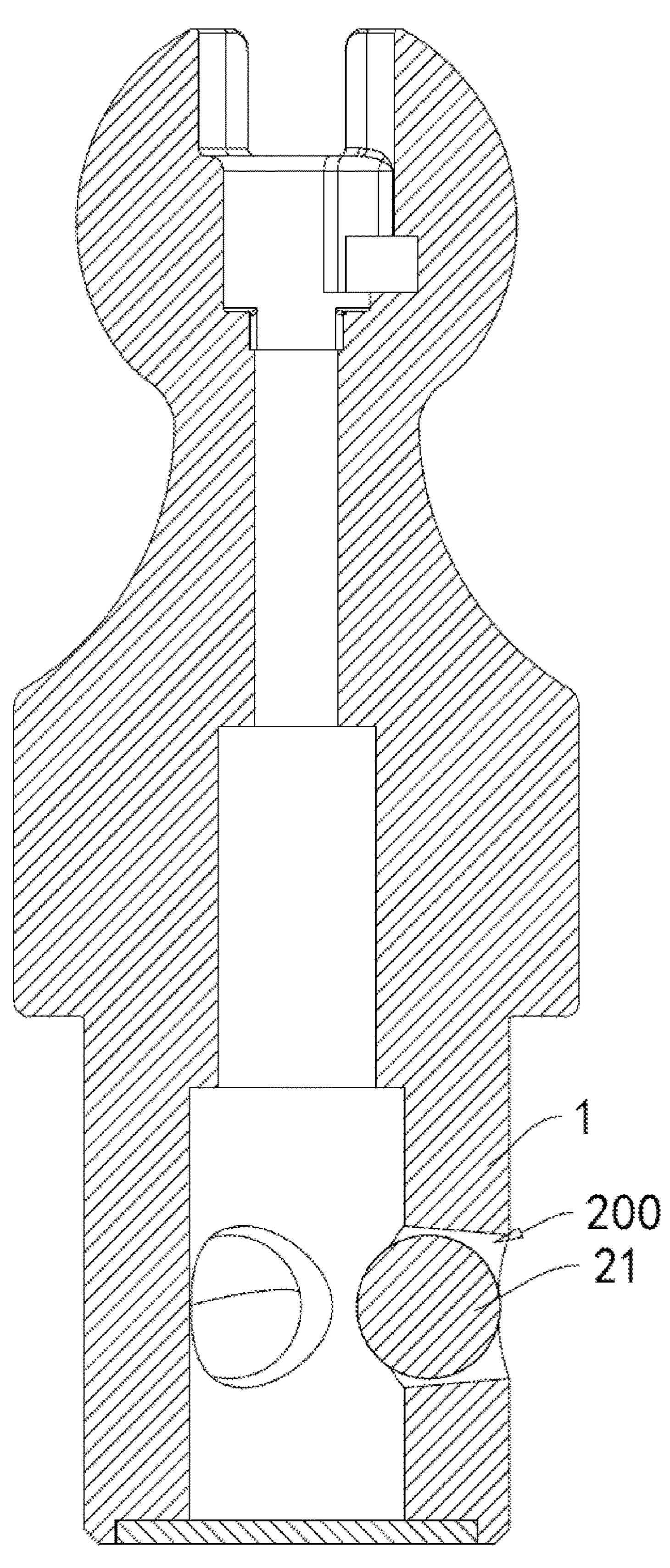
FIG. 6 is a sectional view of an installation of a clamping piece in an embodiment of the present application.

Referring to FIG. 6, the locking component 2 includes three clamping pieces 21. In this embodiment, each of the clamping piece 21 is a sphere. The installation part 14 is provided with three clamping holes 200 that are penetrated, the clamping holes 200 are evenly distributed around an axis of the installation part 14 in a circumferential direction. Each of the clamping pieces 21 passes through and is slidably fitted into each of the clamping holes 200. A diameter of each of the clamping holes 200 is gradually decreased from a center of the housing 1 to an outer side of the housing 1, so that when each of the clamping pieces 21 passes through each of the clamping holes 200, it is not easy to be detached from the clamping hole 200 at one end away from the housing 1. When the installation part 14 is fixedly connected to the ball hook mounting seat 10, each of the clamping pieces 21 is clamping connected to and fixed to the ball hook mounting seat 10.

Figure 7:
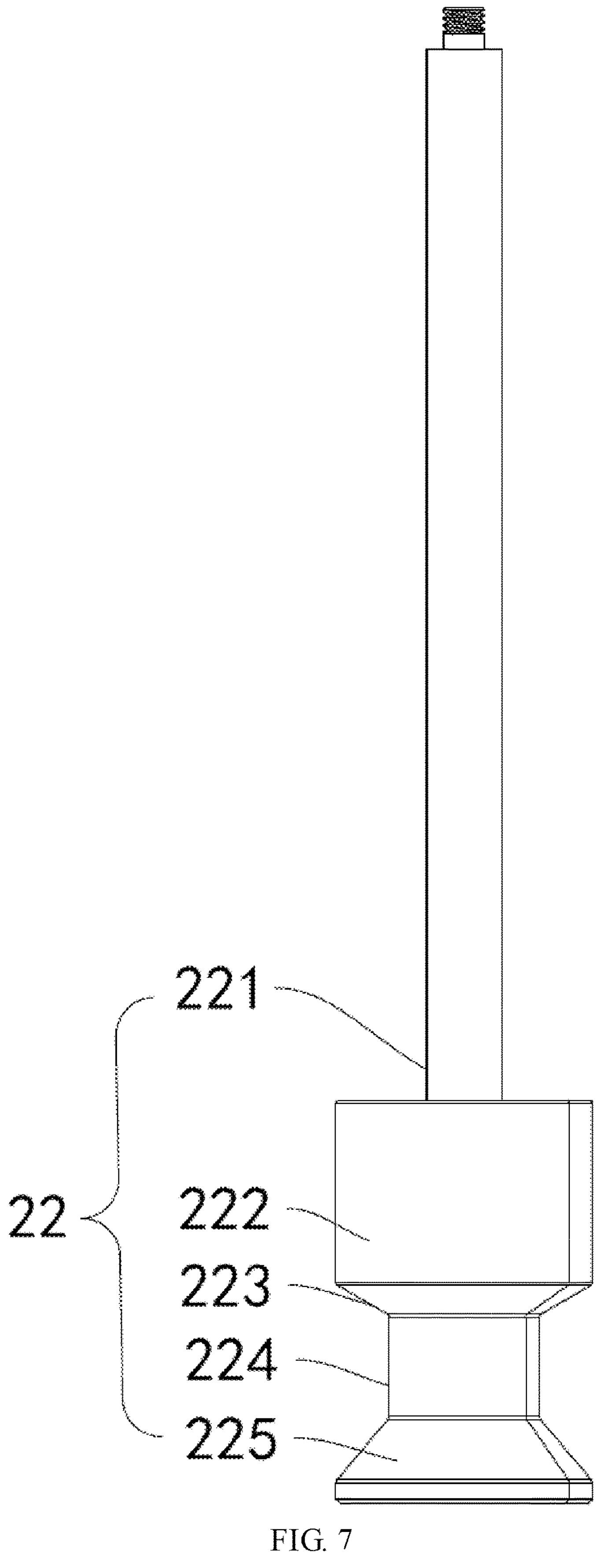
FIG. 7 is a schematic structural diagram of a locking rod in an embodiment of the present application.
Figure 8:
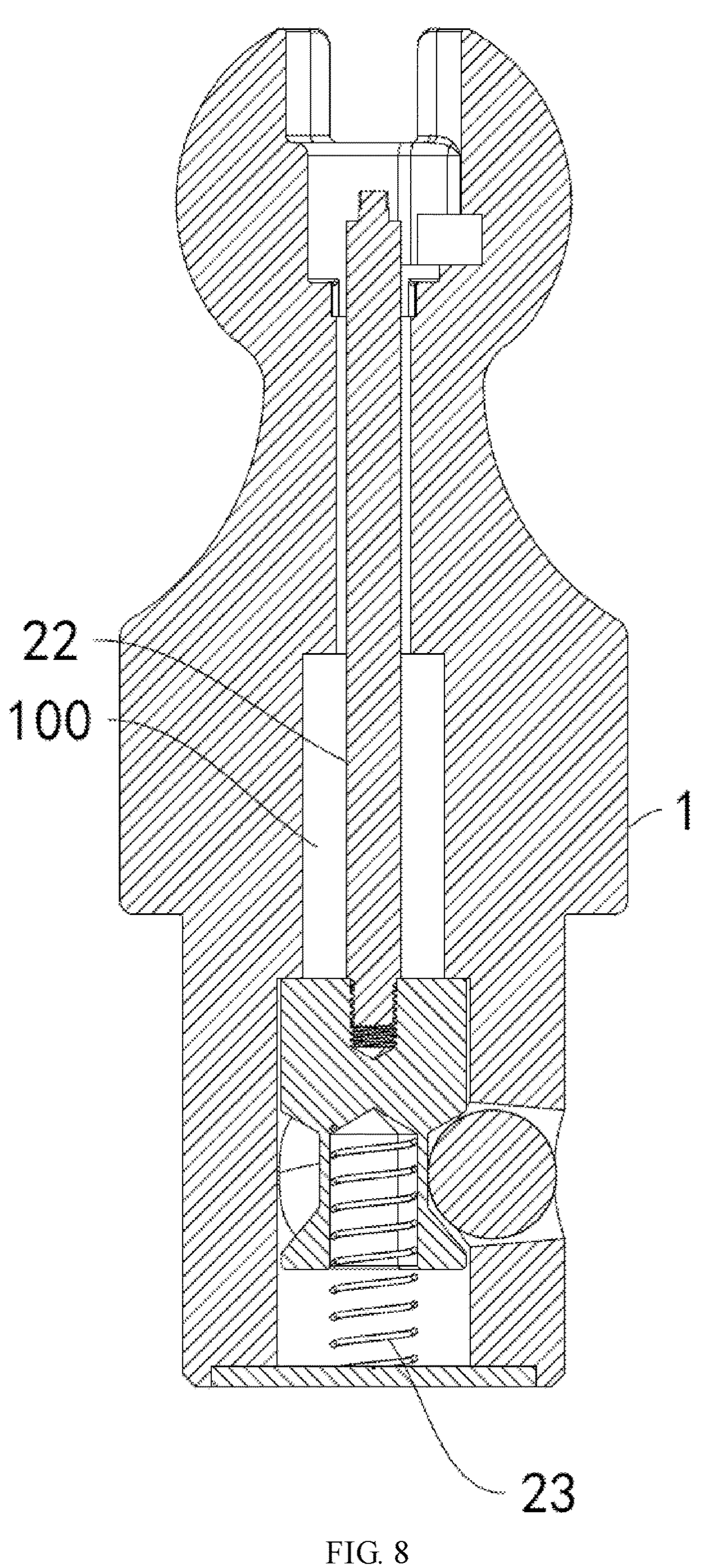
FIG. 8 is a sectional view of an installation of the locking rod in an embodiment of the present application.

Referring to FIGS. 7 and 8, the locking component 2 further includes a locking rod 22, and the locking rod 22 passes through and is slidably fitted into the locking hole 100. The locking rod 22 includes a rod body section 221, a clamping section 222, a conical section 223, a cylindrical section 224, and a bottom section 225. The rod body section 221, the clamping section 222, the conical section 223, the cylindrical section 224, and the bottom section 225 are fixedly connected in sequence. The clamping section 222, the conical section 223, the cylindrical section 224, and the bottom section 225 are all located in the third hole segment 103. When the locking component 2 is unlocked, the cylindrical section 224 abuts against each of the clamping pieces 21. When the locking rod 22 is slid along the locking hole 100 in a direction away from the housing 1, each of the clamping pieces 21 abuts against and the locking rod 22 and the cylindrical section 224 is switch to the conical section 223, each of the clamping pieces 21 is pushed by the conical section 223 to slide along each of the clamping holes 200 away from the housing 1 until each of the clamping pieces 21 abuts against the clamping section 222. At this time, all clamping piece 21 are securely fastened to the ball hook mounting seat 10.

Referring to FIGS. 7 and 8, the locking component 2 further includes a reset spring 23 located in the third hole segment 103, and the reset spring 23 is also located between the bottom sheet 15 and the bottom section 225. One end of the reset spring 23 abuts against the bottom sheet 15, and the other end of the reset spring 23 abuts against the bottom section 225, so that when the locking component 2 is unlocked, the reset spring 23 pushes the locking rod 22 to quickly slide along the locking hole 100 towards a direction close to the housing 1 until the clamping section 222 abuts against a hole wall of the third hole segment 103. Besides that, when the bottom sheet 15 is detached from a bottom of the housing 1, the reset spring 23 can be detached from the third hole segment 103, thereby achieving the installation and replacement of the reset spring 23.

Figure 9:
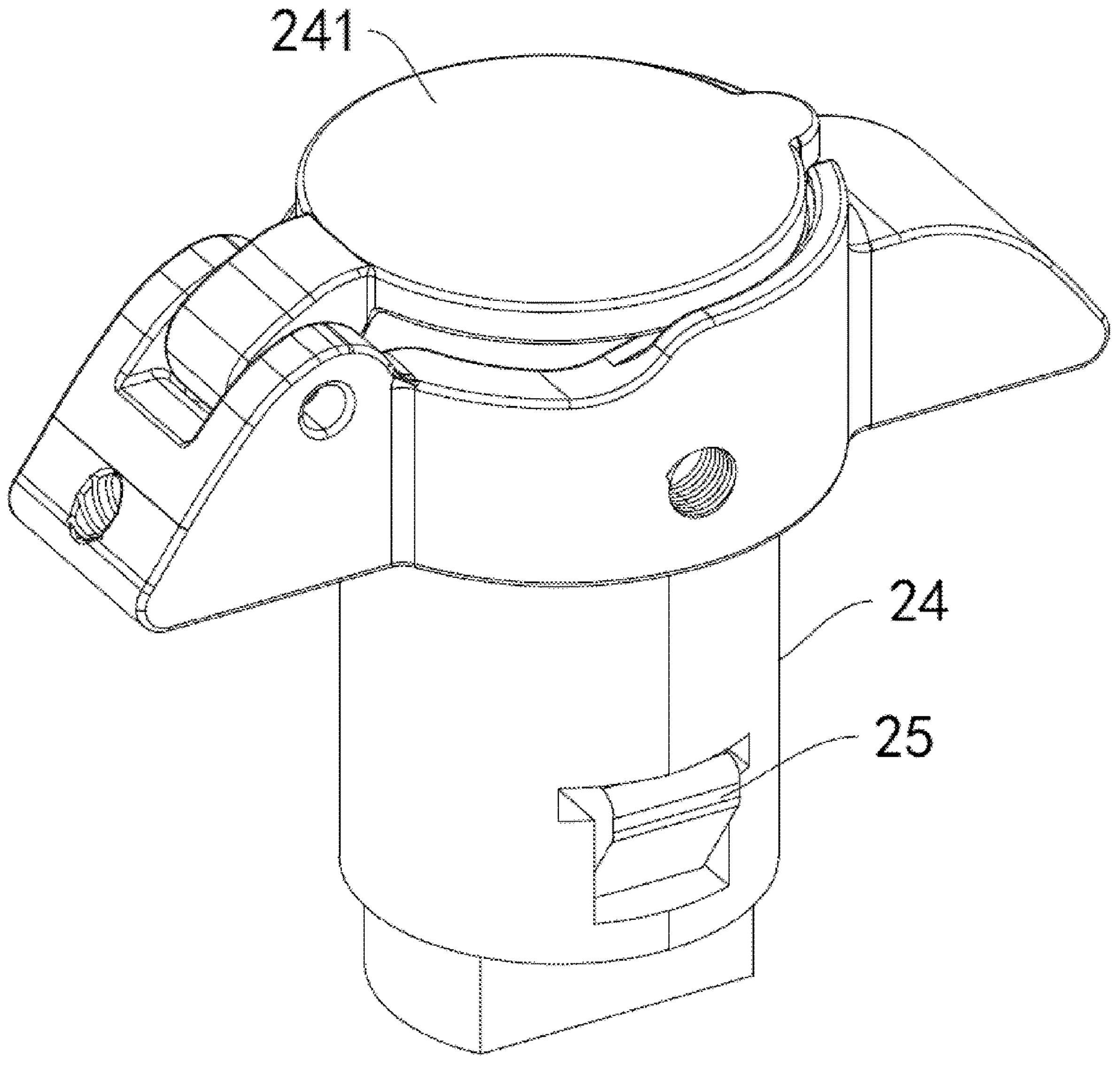
FIG. 9 is a schematic structural diagram of a lock core in an embodiment of the present application.
Figure 10:
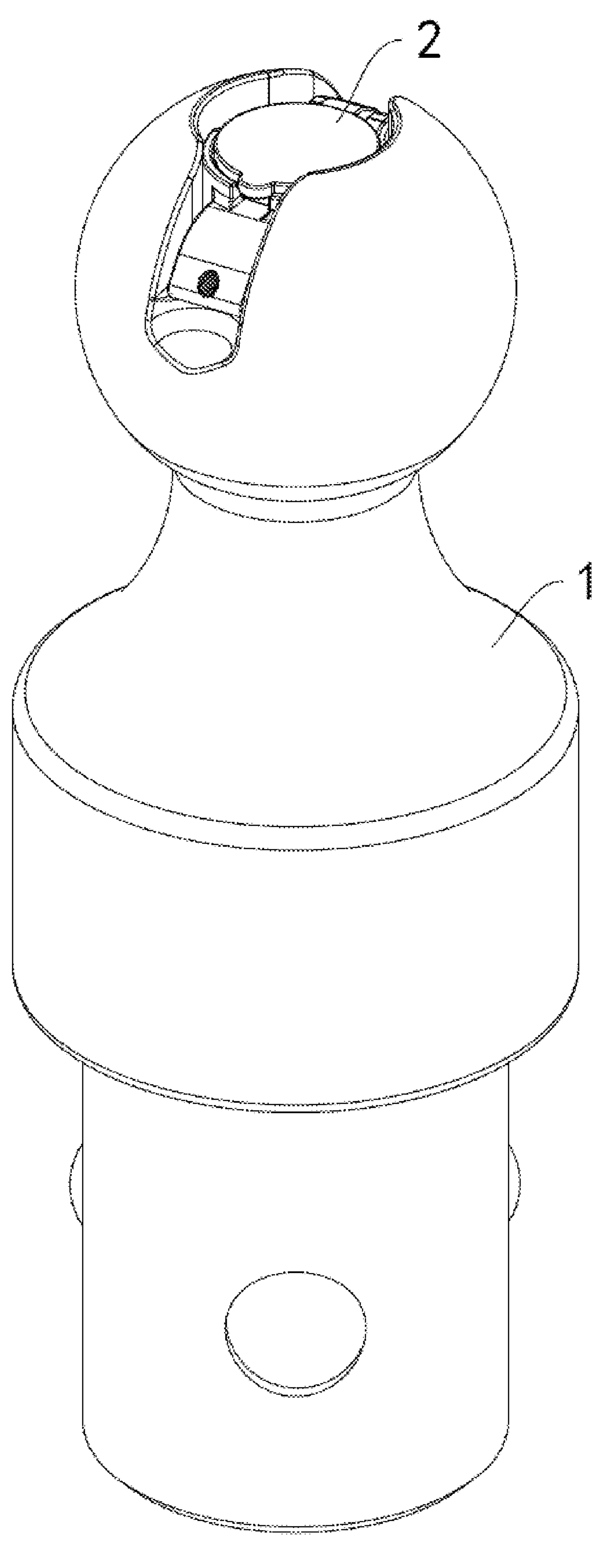
FIG. 10 is a schematic diagram of a locked state of the gooseneck ball.
Figure 11:
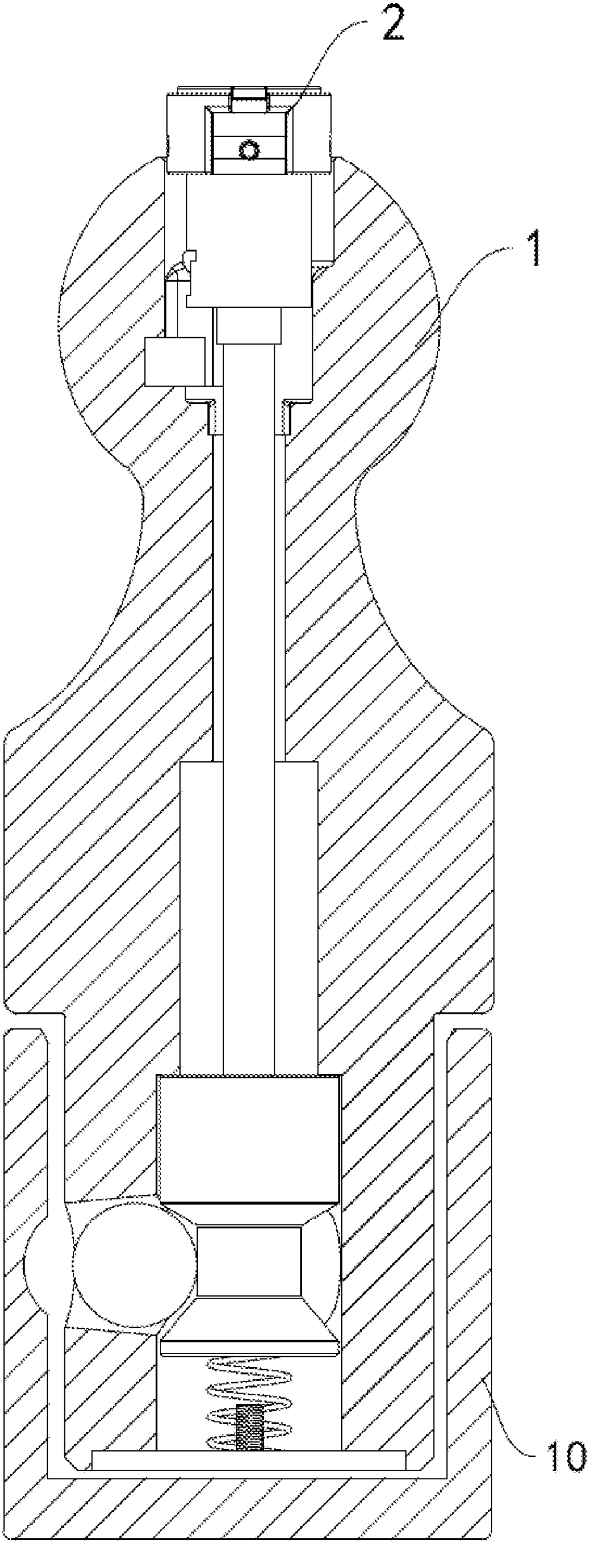
FIG. 11 is a first schematic diagram of a usage state of the gooseneck ball.
Figure 12:
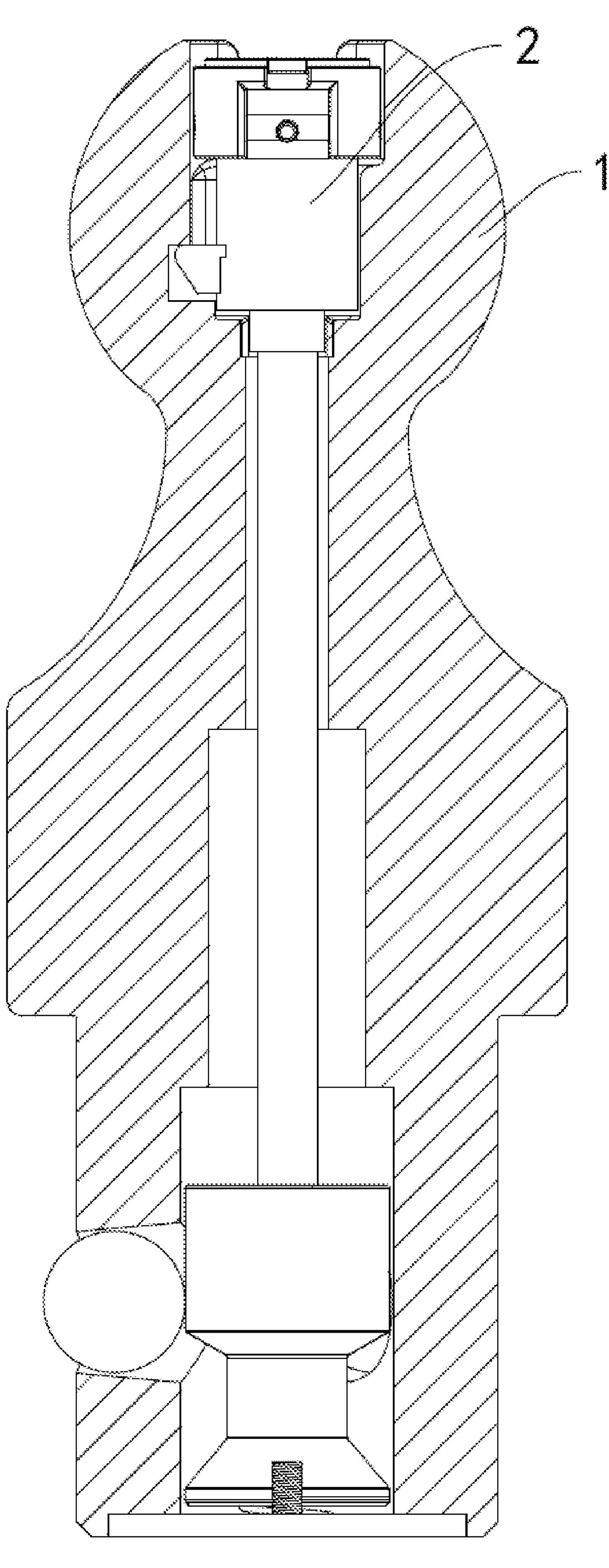
FIG. 12 is a second schematic diagram of the usage state of the gooseneck ball.
Figure 13:
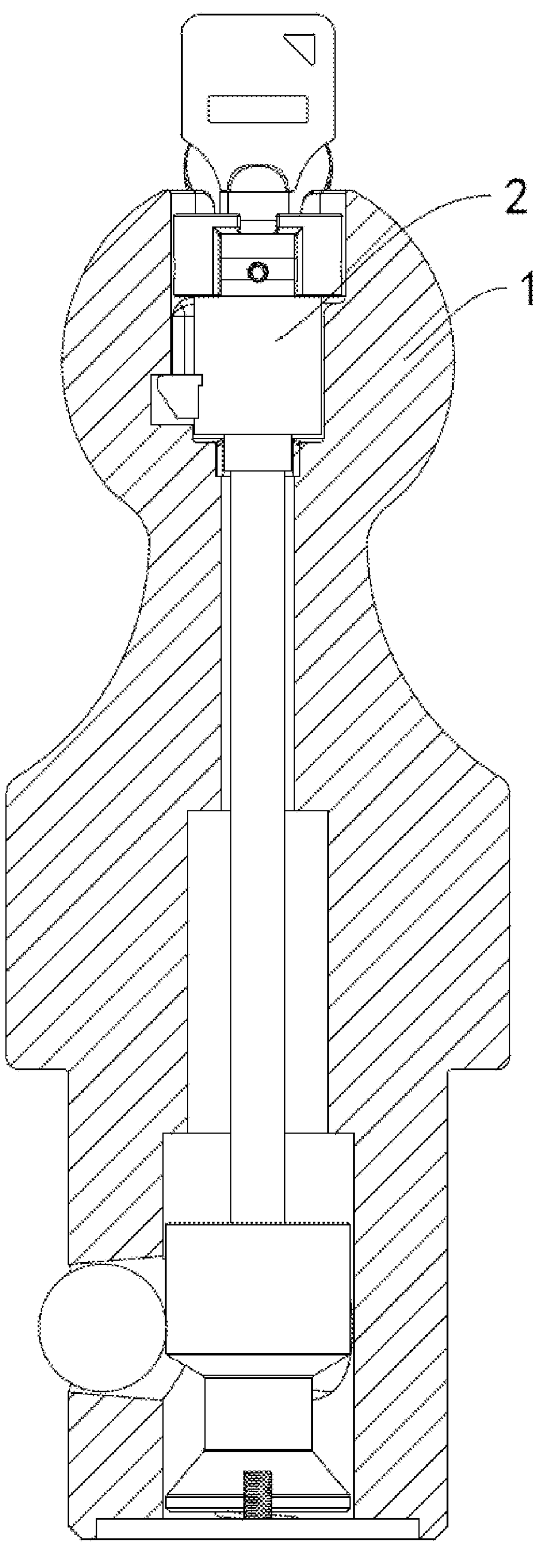
FIG. 13 is a third schematic diagram of the usage state of the gooseneck ball.
Figure 14:
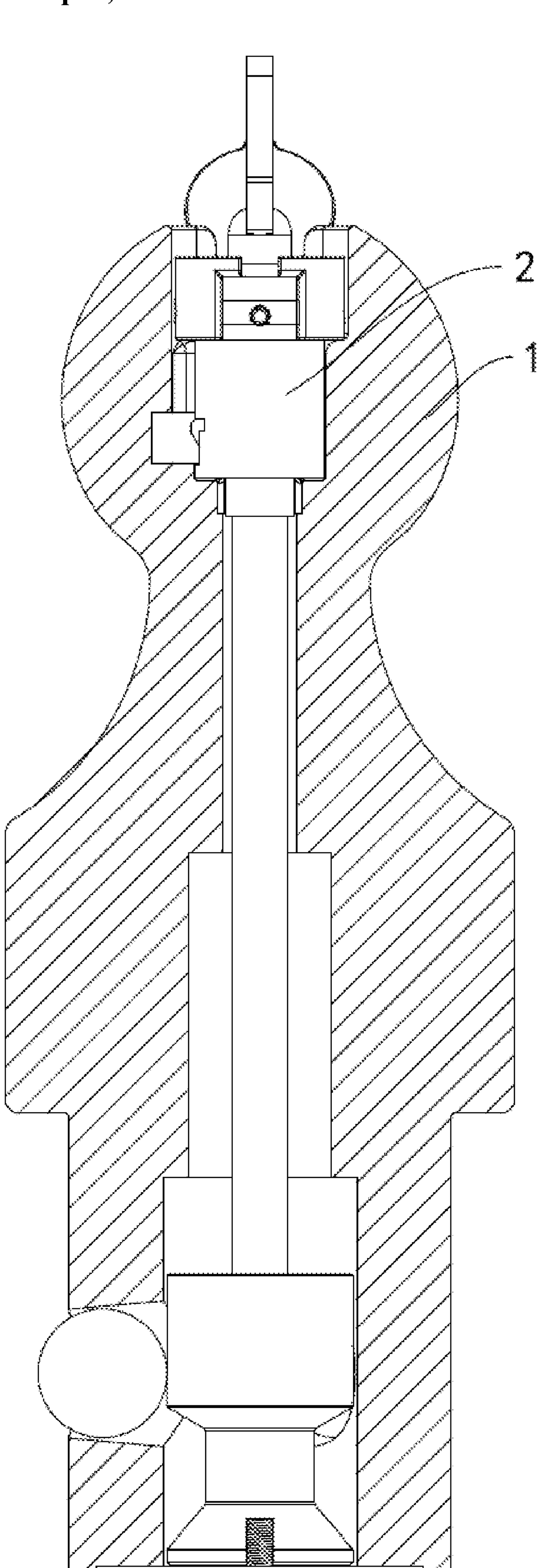
FIG. 14 is a fourth schematic diagram of the usage state of the gooseneck ball.
Figure 15:
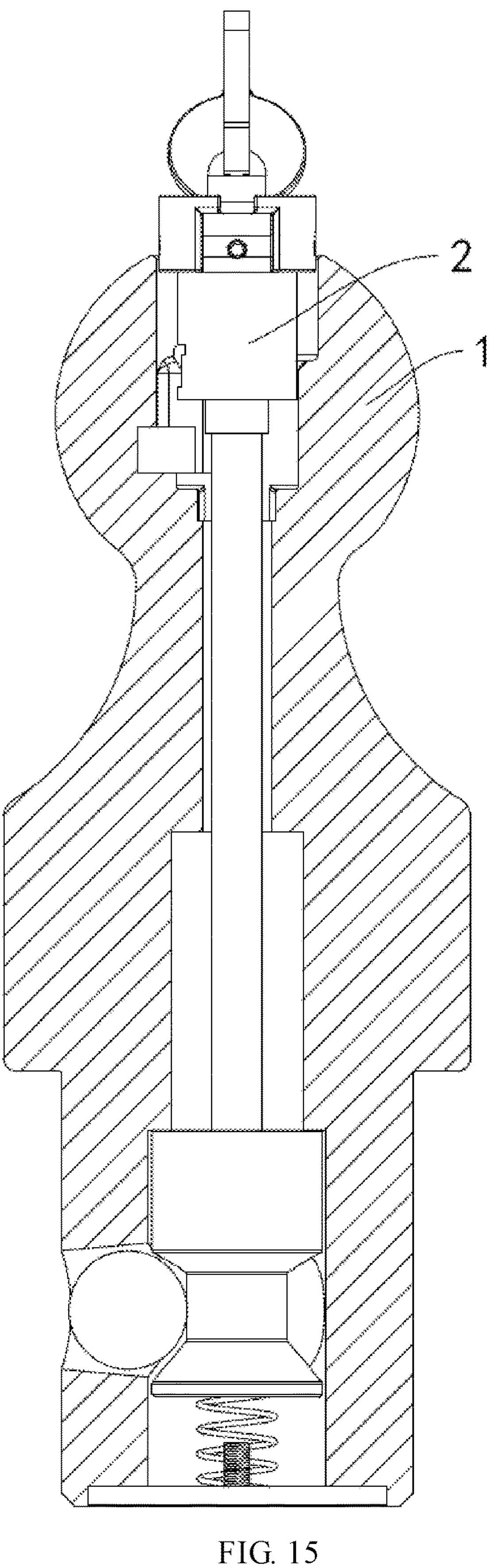
FIG. 15 is a fifth schematic diagram of the usage state of the gooseneck ball.
Figure 16:
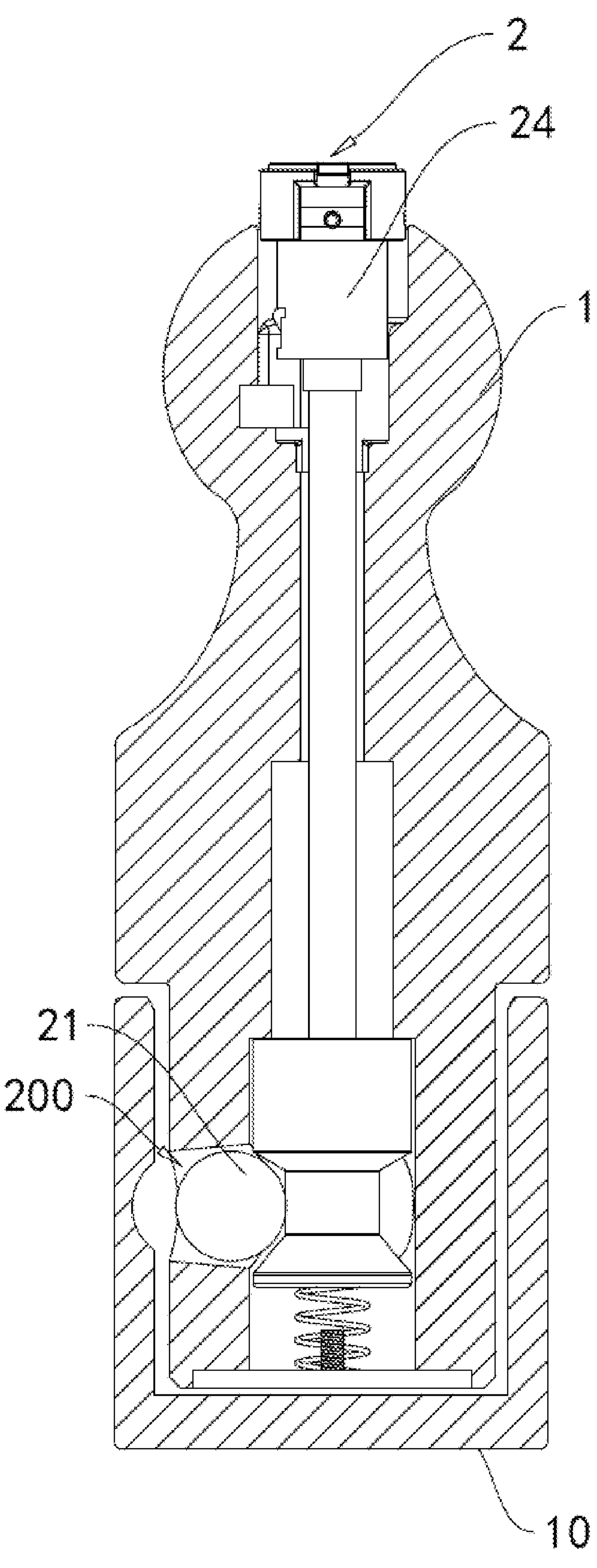
FIG. 16 is a sixth schematic diagram of the usage state of the gooseneck ball.

Referring to FIG. 9, the locking component 2 further includes a lock core 24 and a locking block 25. One end of the spherical part 11 away from the trailer part 12 is provided with a fixing groove 300. The lock core 24 passes through and is slidably fitted into the fixing groove 300. The lock core 24 is fixedly connected to the rod body section 221 of the locking rod 22, so that when the lock core 24 is slid along the fixing groove 300 towards the direction close to the housing 1, it drives the locking rod 22 to slide along the locking hole 100 towards the direction away from the housing 1, thereby pushing each of the clamping pieces 21 to slide away from the housing 1, so that each of the clamping pieces 21 is clamped and fixed with the ball hook mounting seat 10.

The locking block 25 is slidably fitted with the lock core 24. When a key passes through a lock hole of the lock core 24 and drives the lock core 24, the locking block 25 is slid in a direction away from the lock core 24. A groove body of the fixing groove 300 has a locking groove 301. When the lock core 24 is slid along the fixing groove 300 towards a direction close to the housing 1 until the lock core 24 abuts against the bottom of the fixing groove 300, the locking component 2 is locked. When the key passes through the lock hole of the lock core 24 and rotated, the locking block 25 is slid in a direction close to the lock core 24, thereby causing the locking block 25 to be disengaged from the locking groove 301. The locking component 2 is unlocked, and the lock core 24 is rotatably connected to a lock cover 241, and the lock cover 241 is configured to cover the lock core 24

The implementation principle of the anti-theft gooseneck ball in this application is as follows: when the gooseneck ball is provided on the ball hook mounting seat 10, one end of the housing 1 passes through the ball hook mounting seat 10, and each of the clamping pieces 21 is slid along each of the clamping holes 200 in a direction away from the center of the housing 1 until all clamping pieces 21 are clamped and fixed with the ball hook mounting seat 10. Then, the locking component 2 is locked, so that the locking component 2 is fixed with the housing 1, and each of the clamping pieces 21 always remains clamped and fixed with the ball hook mounting seat 10. At the same time, the locking component 2 is locked and fixed with the housing 1, so that when the locking component 2 is not unlocked, the gooseneck ball is not easily removed from the ball hook mounting seat 10, thereby reducing the risk of gooseneck ball being stolen and improving the problem of the goose neck ball being easily screwed onto the ball hook mounting seat 10, which poses a risk of theft.

An anti-theft method for the goose neck ball, including the following steps:

(a) passing through one end of the goose neck ball into the ball hook mounting seat 10;

(b) pushing the lock core until it abuts against the housing, so that all clamping pieces are fixed to the ball hook mounting seat 10;

(c) driving the lock core to drive the driving block to be inserted and fixed in the locking slot, that is, the lock core is locked, so that the locking component is fixed to the housing;

(d) opening the lock core, by a key; causing the lock core to leave the lock slot; causing the driving block to move upwards, and all clamping pieces are unlocked with the ball hook mounting seat 10.

The above are the preferred embodiments of the present application and do not limit the protection scope of the present application. Therefore, any equivalent changes made according to the structure, shape, and principle of the present application should be included in the protection scope of the present application.

What is claimed is:

1. An anti-theft gooseneck ball, comprising:

a housing, one end of the housing passes through a ball hook mounting seat;

a locking component, wherein the locking component is provided on the housing, the locking component comprises a plurality of clamping pieces, a locking block, and a lock core, the housing is provided with a plurality of clamping holes, and each of the clamping pieces respectively passes through and is slidably fitted into each of the clamping holes, and the lock core is slidably fitted into the housing, wherein the plurality of clamping holes are evenly distributed around an axis of an installation part in a circumferential direction;

when the lock core is slid towards the housing and is locked, each of the clamping pieces is fixed and engaged with the ball hook mounting seat;

wherein one end of the housing is provided with a locking hole, and the locking hole comprises a first hole segment, a second hole segment, and a third hole segment; and the first hole segment, the second hole segment, and the third hole segment are sequentially connected;

wherein the locking component further comprises a locking rod; and the locking rod comprises a rod body section, a clamping section, a conical section, a cylindrical section, and a bottom section; the rod body section, the clamping section, the conical section, the cylindrical section, and the bottom section are fixedly connected in sequence; wherein the clamping section, the conical section, the cylindrical section, and the bottom section are all located in the third hole segment.

2. The anti-theft gooseneck ball according to claim 1, wherein the locking rod passes through and is slidably fitted to the housing, and the locking rod is fixedly connected to the lock core;

when the cylindrical section abuts against each of the clamping pieces, the locking component is unlocked, and the locking rod is slid, so that when the locking rod abuts against each of the clamping pieces and slides from the cylindrical section to the clamping section;

the locking rod pushes each of the clamping pieces to clamp and fix with the ball hook mounting seat.

3. The anti-theft gooseneck ball according to claim 2, wherein the locking block is slidably fitted with the lock core, the housing is provided with a locking groove;

when the locking component is locked to fix with the housing, the lock core is slid in a direction close to the housing until it contacts and fits with the housing;

the lock core is driven to push the locking block to pass through and be clamped into the locking groove.

4. The anti-theft gooseneck ball according to claim 3, wherein the lock core is rotatably connected with a lock cover, and the lock cover is configured to cover a lock hole of the lock core.

5. The anti-theft gooseneck ball according to claim 2, wherein the locking component further comprises a reset spring, the reset spring is provided between the locking rod and the housing;

one end of the reset spring abuts against the locking rod, and the other end of the reset spring abuts against the housing.

6. The anti-theft gooseneck ball according to claim 5, wherein one end of the housing is connected to a bottom sheet, and the bottom sheet is disassembled from the housing;

when the bottom sheet is disassembled and detached from the housing, the reset spring is disassembled and detached from the housing.

7. The anti-theft gooseneck ball according to claim 1, wherein the clamping pieces have a shape of sphere.

8. The anti-theft gooseneck ball according to claim 7, wherein a diameter of the clamping hole is gradually decreased from a center of the housing to an outer side of the housing.

9. The anti-theft gooseneck ball according to claim 1, wherein there are three clamping pieces, and the clamping pieces are distributed around an axis of the housing in a circumferential direction.

10. An anti-theft method for the goose neck ball according to claim 1, comprises the following steps:

(a) passing through one end of the goose neck ball into the ball hook mounting seat;

(b) pushing the lock core until it abuts against the housing, so that all clamping pieces are fixed to the ball hook mounting seat;

(c) driving the lock core to drive the driving block to be inserted and fixed in the locking slot, that is, the lock core is locked, so that the locking component is fixed to the housing;

(d) opening the lock core, by a key; causing the lock core to leave the lock slot, causing the driving block to move upwards, and all clamping pieces are unlocked with the ball hook mounting seat;

wherein the plurality of clamping holes are evenly distributed around an axis of an installation part in a circumferential direction;

wherein one end of the housing is provided with a locking hole, and the locking hole comprises a first hole segment, a second hole segment, and a third hole segment; and the first hole segment, the second hole segment, and the third hole segment are sequentially connected;

wherein the locking component further comprises a locking rod; and the locking rod comprises a rod body section, a clamping section, a conical section, a cylindrical section, and a bottom section; the rod body section, the clamping section, the conical section, the cylindrical section, and the bottom section are fixedly connected in sequence; wherein the clamping section, the conical section, the cylindrical section, and the bottom section are all located in the third hole segment.

* * * * *